C. W. BUFFINGTON.
Steering Apparatus for Vessels.

No. 145,394. Patented Dec. 9, 1873.

Witnesses:
Louis H. Rotenhagen
Inert J. Finn

Inventor:
Charles W. Buffington
Per Geo. W. Tibbitts
Atty

UNITED STATES PATENT OFFICE.

CHARLES W. BUFFINGTON, OF CLEVELAND, OHIO.

IMPROVEMENT IN STEERING APPARATUS FOR VESSELS.

Specification forming part of Letters Patent No. 145,394, dated December 9, 1873; application filed September 15, 1873.

*To all whom it may concern:*

Be it known that I, CHARLES W. BUFFINGTON, of Cleveland, Ohio, have invented a Steering Apparatus, of which the following is a specification:

The object of my invention is to provide an easy means of turning the rudder of sailing-vessels, and holding it in place firmly against the action of the waves of the sea, by the combination, with the steering-wheel, of two operating-screws connected with the rudder-post, said screws arranged in a frame, and having gear-pinions attached and operated by a gear-wheel on the main shaft, which is turned by the steering-wheel.

To fully understand the said invention, I proceed to describe its construction and operation, referring to the accompanying drawing, in which—

Figure 1:
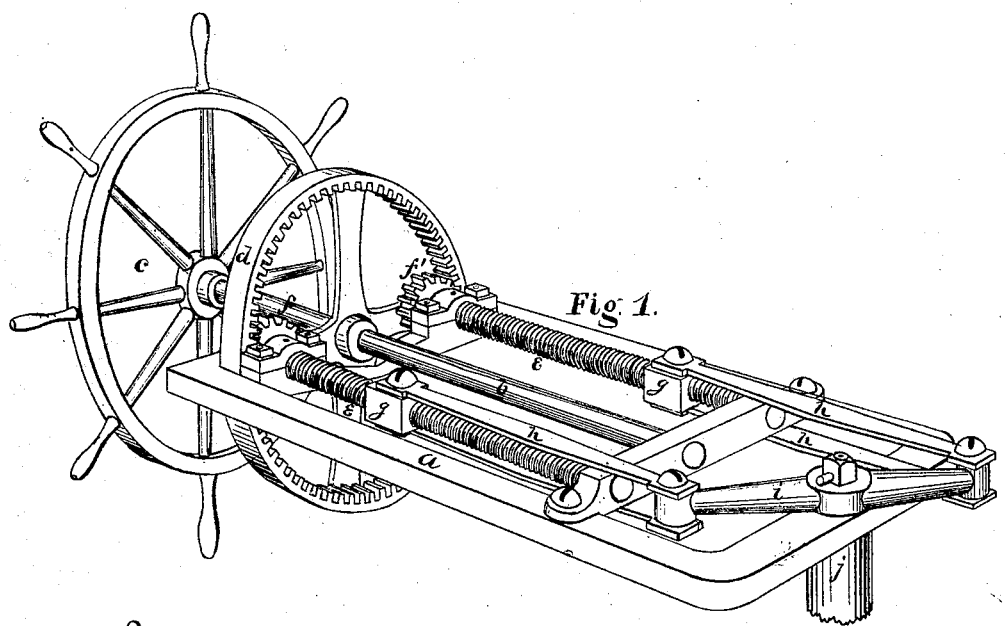
Figure 2:
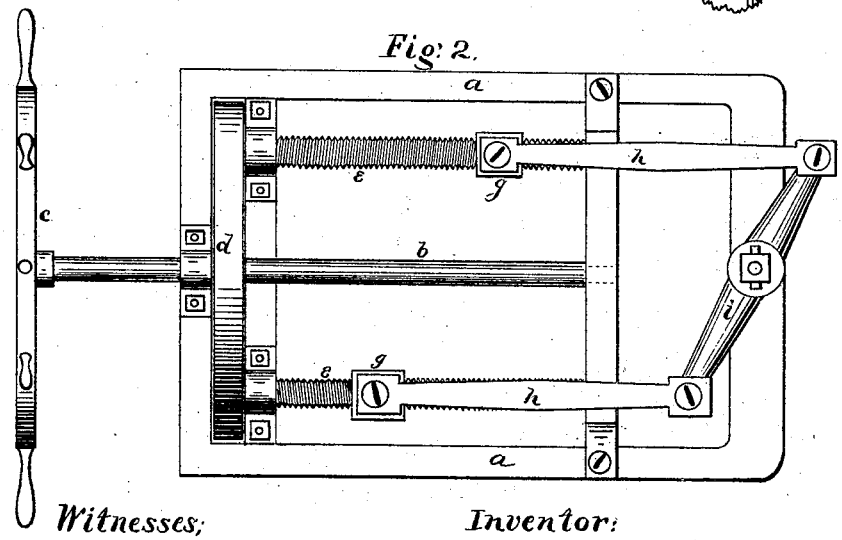

Figure 1 is a perspective view. Fig. 2 is a plan view.

$a$ is a frame. $b$ is a shaft having its bearings in the cross-bars of said frame, as shown, and which extends out from the frame, and has attached the steering-wheel $c$. Upon the said shaft $b$ is placed a geared wheel, $d$, having the teeth on the inside of its rim, as seen in Fig. 1. $e\ e$ are screws journaled in the cross-bars of the frame, and provided with pinions $f\ f'$, operated by the wheel $d$. One of the screws, $e$, is a right-hand screw, and the other is a left-hand screw. Upon each of the screws is placed a square block-nut, $g$, which, when the screws revolve, travel back and forth on them. To the said nuts $g$ are jointed connecting-rods $h\ h$, connecting the nuts with a cross-head, $i$, on the rudder-post $j$.

This apparatus is placed on suitable supports in front of the rudder-post of a vessel; and the advantages of it over the ordinary steering-wheel and other apparatus is the power gained by the leverage in the wheel $d$, operating the screws, and also against the liability of the rudder, by the force of the waves, turning the wheel. By it one man can easily operate the rudder, and should he have occasion to let go of the wheel to shift or adjust sail, or for any purpose leave the wheel, it cannot turn by itself out of place; and it takes from two and a half to three turns of the wheel $d$ to cause the block-nuts $g$ to travel the length of the screws to turn the rudder clear about.

The rods $h\ h$ are connected with the cross-head or tiller-arm $i$ by removable pins or bolts, so that they can be readily detached therefrom and the said tiller-arm taken off the rudder-post and one of different size or length substituted for it, to increase or diminish the power. The rods $h\ h$ radiate from the nuts to the tiller-arm, as from a common center, whereby the pressure upon the screws is more fully equalized, and the friction diminished.

I claim as my invention—

In a steering apparatus having a right and left hand screw, operated by gearing connected with the steering-wheel, constructed as herein described, the combination therewith and the nuts $g\ g$ of the arms or rods $h\ h$ and tiller-arm $i$, detachably connected, for the purpose of substituting a tiller-arm of different length, as set forth.

CHARLES WM. BUFFINGTON.

Witnesses:
GEO. W. TIBBITTS,
J. F. SULLIVAN.